United States Patent [19]
Koide et al.

[11] Patent Number: 5,346,648
[45] Date of Patent: Sep. 13, 1994

[54] ANTIFERROELECTRIC LIQUID CRYSTAL COMPOUND AND LIQUID CRYSTAL COMPOSITION CONTAINING THE SAME

[75] Inventors: Yasuhiro Koide; Hiroyuki Mogamiya; Yoshiichi Suzuki, all of Tokyo, Japan

[73] Assignee: Showa Shell Sekiyu Kabushiki Kaisha, Tokyo, Japan

[21] Appl. No.: 128,106

[22] Filed: Sep. 29, 1993

[30] Foreign Application Priority Data

Sep. 30, 1992 [JP] Japan .................................. 4-285181

[51] Int. Cl.$^5$ .................. C09K 19/12; C09K 19/20; C07C 229/42
[52] U.S. Cl. .................. 252/299.65; 252/299.64; 252/299.66; 252/299.62; 560/19; 560/44
[58] Field of Search ........... 252/299.1, 299.62, 299.64, 252/299.65, 299.66, 299.67; 560/19, 44

[56] References Cited

U.S. PATENT DOCUMENTS 5,171,471 12/1992 Suzuki et al. .................. 252/299.61

FOREIGN PATENT DOCUMENTS 0422996 4/1991 European Pat. Off. .
0521617 1/1993 European Pat. Off. .

OTHER PUBLICATIONS

CA:92 (9):76053Q "Mesomorphic 4–Alkylphenyl 4–Benzoyloxybenzoate Bearing a Terminal Vinyl Group", Kamogawa et al.
Bull. Chem. Soci. Jpn. 52(10), Abstract.
EPA Abstract JP–63132869 (2 pages).

Primary Examiner—Shean Wu
Attorney, Agent, or Firm—Cushman, Darby & Cushman

[57] ABSTRACT

An antiferroelectric liquid crystal compound represented by the following general formula (I):

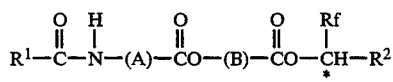

wherein $R^1$ and $R^2$ are each independently selected from the group consisting of alkyl groups having from 3 to 18 carbon atoms, Rf is a lower alkyl group or a fluorinated lower alkyl group, (A) and (B) are each independently selected from the group consisting of 1,4-phenylene, 4,4'-biphenylene, and 2,6-naphthalene which may be substituted at least with a halogen atom, and * shows an asymmetric carbon atom.

7 Claims, 4 Drawing Sheets

APPLIED TRIANGULAR WAVE VOLTAGE

OPTICAL RESPONSE OF NEMATIC LIQUID CRYSTAL ON MARKET

OPTICAL RESPONSE OF LIQUID CRYSTAL HAVING IDEAL BISTABLE STATES

OPTICAL RESPONSE OF LIQUID CRYSTAL HAVING TRISTABLE STATES OF PRESENT INVENTION

SWITCHING OF BISTABLE STATES

SWITCHING OF TRISTABLE STATES

ANTIFERROELECTRIC LIQUID CRYSTAL COMPOUND AND LIQUID CRYSTAL COMPOSITION CONTAINING THE SAME

FIELD OF THE INVENTION

The present invention relates to a novel liquid crystal compound having an amide linkage and a liquid crystal composition containing the compound.

BACKGROUND OF THE INVENTION

The optically active liquid crystal compounds of the present invention are antiferroelectric liquid crystals having a ferroelectric property showing bistable states and also having an antiferroelectric property showing really novel optical tristable states. The liquid crystal compounds as well as liquid crystal compositions containing the compound can be used for display elements as well as electrooptical devices utilizing responses of the liquid crystal compound to electric field.

As applications of liquid crystals, electrooptical apparatuses using a nematic liquid crystal such as a DSM cell, TN cell, G-H cell, or STN cell have been developed and practically used. However, all of the electrooptical apparatuses using such a nematic liquid crystal have a defect that response time is as slow as several msec to several tens msec, leading to a considerable restriction in their applications. The slow response of the electrooptical apparatuses or elements using the nematic liquid crystal is due to the fact that the torque which changes the position of molecules is inherently based on the anisotropy of dielectric constant, and thus its force is not so strong. With such a technical background, the development of ferroelectric liquid crystals had been attempted which have a spontaneous polarization (Ps), have a strong torque based on Ps×E (E is an applied voltage), and have an extremely short optical response time of few $\mu$sec to several tens of $\mu$sec to make the preparation of hypervelocity devices possible.

Mayer et al. synthesized DOBAMBC (p-decyloxy-benzilidene-p-ammino-2-methylbutyl cinnamate) in 1975 for the first time in the world and it has been confirmed to be a ferroelectric liquid crystal (Le Journal de Physique, Vol. 36, 1975, L-69).

Further, since Clark and Lagawall reported in 1980 on such characteristics on display devices as high velocity response of submicroseconds and memory characteristics of DOBAMBC, ferroelectric liquid crystals have absorbed considerable public attention (N. A. Clark et al., Appl. Phys. Lett. 36, 899 (1980)).

However, there were many technical problems in their system for practical use. Particularly, there was not any available material showing ferroelectric liquid crystallinity at an ambient temperature, nor was effective and practical method established for controlling the alignment of liquid crystal molecules control of which is essential for display devices.

After the publication of the report, various attempts have been made from both aspects of liquid crystal material and device. Display devices utilizing the switching between twisted bistable states were prepared for trial, and high speed electrooptical apparatuses using the device are proposed in U.S. Pat. No. 4,367,924 and others. However, high contrast and proper potential of threshold value have not been obtained.

From such a point of sight, other switching systems were explored to propose a transitional diffusion system. Subsequently, a three states switching system of a liquid crystal having tristable states was reported in 1988 (A. D. L. Chandani, T. Hagiwara, Y. Suzuki et al., Japan, J. of Appl. Phys., 27, (5), L729–L732 (1988)).

The optical tristable states herein referred to mean that, when a voltage in the form of a triangular wave as shown in FIG. 1 A is applied to a liquid crystal electrooptical device in which an antiferroelectric liquid crystal is laid between the first electrode substrate plate and the second electrode substrate plate which are apart at a given space from each other, the antiferroelectric liquid crystal shows the first stable molecular orientation, that is, the first optically stable state which corresponds to the point 2 in FIG. 1 D when electric voltage is zero. The antiferroelectric liquid crystal shows the second stable molecular orientation, that is, the second optically stable state which corresponds to the point 1 in FIG. 1 D in the electric field of one direction, and shows the third stable molecular orientation, that is, the third optically stable state which corresponds to the point 3 in FIG. 1 D in the electric field of other direction.

Liquid crystal electrooptical apparatuses utilizing the tristable states, that is, three states are proposed in U.S. Pat. No. 5,046,823 filed by the present applicant.

The characteristics of an antiferroelectric liquid crystal showing the tristable states are described in more detail below.

In the ferroelectric liquid crystal element having a stabilized surface which was proposed by Clark-Lagawall, ferroelectric liquid crystal molecules show two stable states in which the molecules are uniformly oriented or aligned in one direction in the phase S*C. The molecules are stabilized in either state depending on the direction of applied electric field as shown in FIGS. 2 (a) and (b), and the states are kept even when the electric field was shut off.

Actually, however, the alignment of the ferroelectric liquid crystal molecules shows twisted two states in which directors of the liquid crystal molecules are twisted or the molecules show a chevron structure in which layers of the molecules are bent in a doglegged shape. In the chevron layer structure, a switching angle becomes small, forming a cause for a low contrast, which constitutes a serious obstacle for its practical use.

On the other hand, in the liquid crystal electrooptical devices, an "anti" ferroelectric liquid crystal molecules are aligned in antiparallel, tilting in opposite direction at every adjoining layer, in the phase S*(3) showing the tristable states, and thus the dipoles of the liquid crystal molecules are negating each other. Accordingly, the spontaneous polarization is nullified as a whole. The transmittance of the liquid crystal phase showing such molecular alignment corresponds to the point 2 in FIG. 1 D.

Further, when a voltage sufficiently higher than a threshold value of (+) or (−) was applied, liquid crystal molecules are tilted in the same direction and aligned in parallel as shown in FIGS. 3 (b) and (c). In these states, the spontaneous polarization is produced since the dipoles are also shifted to the same direction to form a ferroelectric phase, and the transmittance of the liquid crystal phase in those states correspond to the points 1 or 3 in FIG. 1 D.

That is, in the phase S*(3) of the "anti" ferroelectric liquid crystal, the "anti" ferroelectric phase at the time of no-electric field and also two ferroelectric phases due to the polarity of applied electric field are stabilized, and switching is carried out among the tristable states of an "anti" ferroelectric phase and two ferroelectric phases, with a direct current-like threshold value. Based on the change in the alignment of liquid crystal molecules accompanied with the switching, light transmittance is changed while drawing such a double hysteresis as shown in FIG. 4.

One of the characteristics of the present invention is that a memory effect can be realized by applying a bias voltage and then further applying a pulse voltage to the double hysteresis as shown in FIG. 4 (A).

Moreover, the ferroelectric phase is stretched in terms of its layer by the application of an electric field to form a book-shelf structure. On the other hand, in the "anti" ferroelectric phase of the third stable state, an analogous book-shelf structure is formed. Since the switching of the layer structure due to the application of an electric field gives a dynamic shear to liquid crystal layers, alignment defects are improved during driving, and thus a good molecular alignment can be realized.

In the "anti" ferroelectric liquid crystal, since image display is performed by alternatively using both hysteresises of plus side and minus side, after-image phenomenon due to the accumulation of inner electric field based on the spontaneous polarization can be prevented.

As explained above, the "anti" ferroelectric liquid crystal compound can be said to be very useful since it has advantages as follows:

1) Hipervelocity response is possible,
2) High contrast and wide viewing can be expected, and
3) Excellent alignment characteristics and a memory effect can be realized.

Reports have been made on the liquid crystal phase of the "anti" ferroelectric liquid crystal showing the tristable states in the following articles:

1) A. D. L. Chandani et al., Japan J. Appl. Phys., 28, L-1265 (1989), and
2) H. Orihara et al., Japan J. Appl. Phys., 29, L-333 (1990).

The liquid phase is called "Phase S*CA" (Antiferroelectric Smectic C* phase) in association with the "anti" ferroelectric property. The phase is named "phase $S^*_{(3)}$" in the present specification since the liquid crystal phase performs the switching among tristable states.

The liquid crystal compounds which have the "anti" ferroelectric phase $S^*_{(3)}$ showing the tristable states in a phase series are disclosed in Japanese Unexamined Patent Publication No. 1-316367, U.S. Pat. Nos. 5,171,471 and 4,973,738, and European Patent No. 330,491 A filed by the present inventors, and in Japanese Unexamined Patent Publication No. 1-213390 filed by Ichihashi et al. Liquid crystal electrooptical devices utilizing the tristable states are proposed in Japanese Unexamined Patent Publication No. 2-40625 and U.S. Pat. No. 5,046,823 filed by the present inventors.

The liquid crystal compounds having an amide linkage are reported in Japanese Unexamined Patent Publication Nos. 63-126865, 63-132869, and 2-151684.

However, Japanese Unexamined Patent Publication No. 63-126865 has disclosed optically active, cyclic amide compounds such as indole ring compounds, and Japanese Unexamined Patent Publication No. 63-132869 has disclosed compounds prepared by using L-isoleucine derived from a natural substance as a starting raw material. Both of them are chiral dopant compounds which produce a ferroelectric chiral smectic phase when blended in an amount of about 5% to a base liquid crystal.

Further, Japanese Unexamined Patent Publication No. 2-151684 has proposed the use of amides such as dimethyl formamide, dibutyl formamide, and diphenyl formamide as a stabilizer to a change with the passage of time of a liquid crystal phase.

As will be understood from the above, any report has not yet been published on an "anti" ferroelectric liquid crystal having an amide linkage.

When liquid crystal materials to be actually used are produced at the present time, it is seldom or never that a liquid crystal compound is used by itself. Usually, few kinds or more of liquid crystal compounds are used in combination as a composition, and if circumstances require, the liquid crystal compound is used together with a not-liquid crystal substance as dopant. This is a reflection of the fact that a single liquid crystal compound has not been developed which satisfy the requirements on practically usable temperature range and electrooptical characteristics.

The "anti" ferroelectric liquid crystal compounds have also the same problem and thus two kinds or more of "anti" ferroelectric liquid crystal compounds are usually mixed to exhibit several characteristics as a composition satisfying the purpose of using the compound.

The following characteristics of materials are required for "anti" ferroelectric liquid crystals:

1) The material exhibits an "anti" ferroelectric phase S*CA at a broad temperature range including an ambient temperature,
2) The material shows a high speed response in an order of ten odd μsec at a temperature range practically used,
3) The material has a high threshold value suitable for display driving, and
4) The material has a stable and good alignment characteristic.

Among the characteristics of materials, storage temperature range in particular is a basic physical property which is important for developing displays, and the broad temperature range from about −30° C. to about 100° C. is generally required. When a liquid crystal composition having the objective, practical storage temperature range is prepared by mixing few kinds or more of liquid crystal compounds at an appropriate blend ratio to achieve the purpose mentioned above, it becomes necessary to use at least one liquid crystal compound as a component to be blended which exhibits an objective liquid crystal phase at a high temperature range by itself in order to expand the phase transition temperature at a high temperature range. Accordingly, the development or exploration of antiferroelectric liquid crystal compound becomes principally an important subject for putting liquid crystal displays to practical use.

As a result of exploration of various liquid crystal compounds from the view point of putting antiferroelectric liquid crystals to practical use, the liquid crystal compounds have been found which have an amide linkage and show a phase S*CA in a high temperature range, and thus can efficiently be used for expanding the high temperature range of "anti" ferroelectric liquid crystal composition.

SUMMARY AND OBJECTS OF THE INVENTION

An antiferroelectric liquid crystal compound represented by the following general formula (I):

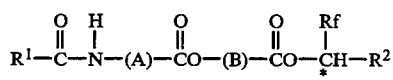

wherein $R^1$ and $R^2$ are independently selected from the group consisting of alkyl groups having from 3 to 18 carbon atoms, Rf is a lower alkyl group or a fluorinated lower alkyl group, (A) and (B) are independently selected from the group consisting of 1,4-phenylene, 4,4'-biphenylene, and 2,6-naphthalene which may be substituted at least with a halogen atom, and * shows an asymmetric carbon atom.

An object of the present invention is to provide a liquid crystal compound having a novel skelton structure.

Another object of the present invention is to provide a novel antiferroelectric liquid crystal compound having an amide linkage.

Still another object of the present invention is to provide a novel liquid crystal composition containing the liquid crystal compound.

Further objects of the present invention will be apparent to those skilled in the art from the following detailed description and appended claims.

BRIEF DESCRIPTION OF THE FIGURES

FIG. 4 also shows a bias voltage and a pulse voltage added to the double hysteresis.

Figure 1:
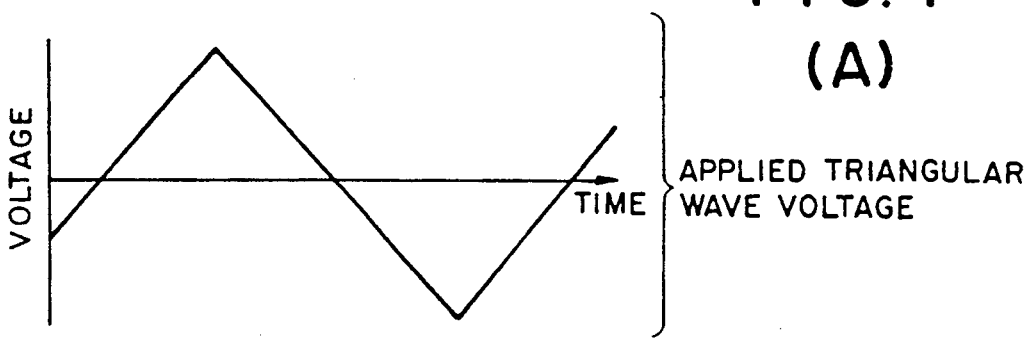
FIG. 1(A) shows an applied triangular wave voltage.
FIG. 1(B) shows an optical response characteristic of a pneumatic liquid crystal which is on the market.
FIG. 1(C) shows the optical response characteristics of a liquid crystal having bistable states.
FIG. 1(D) shows the optical response characteristics of a liquid crystal having tristables states.
Figure 1:
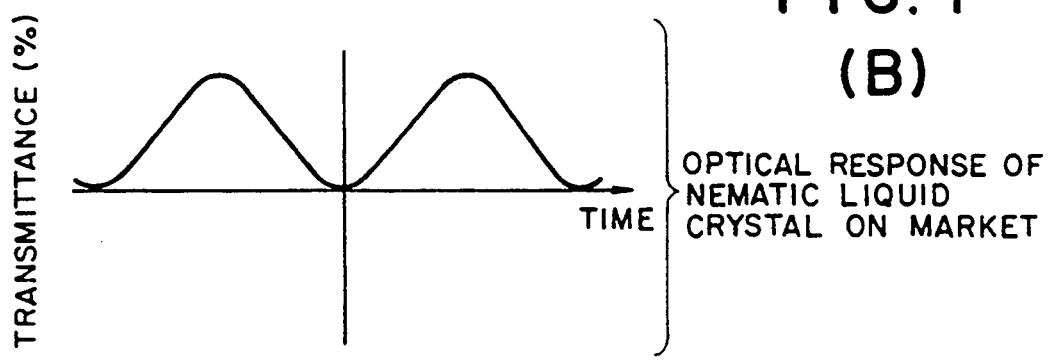
Figure 1:
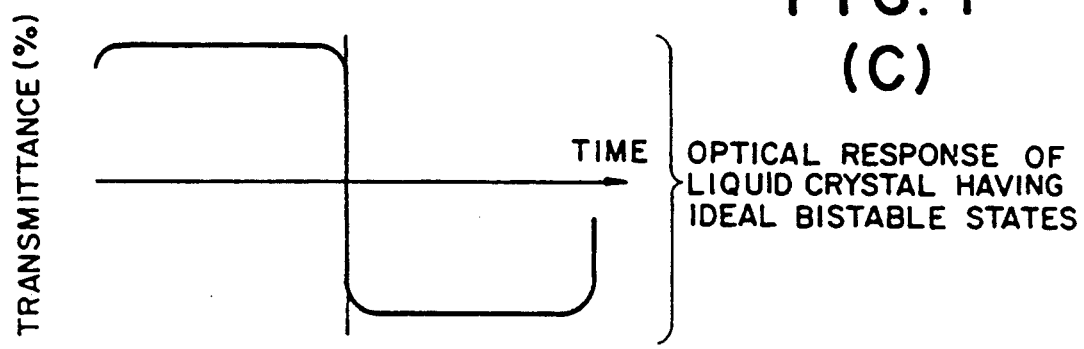
Figure 1:
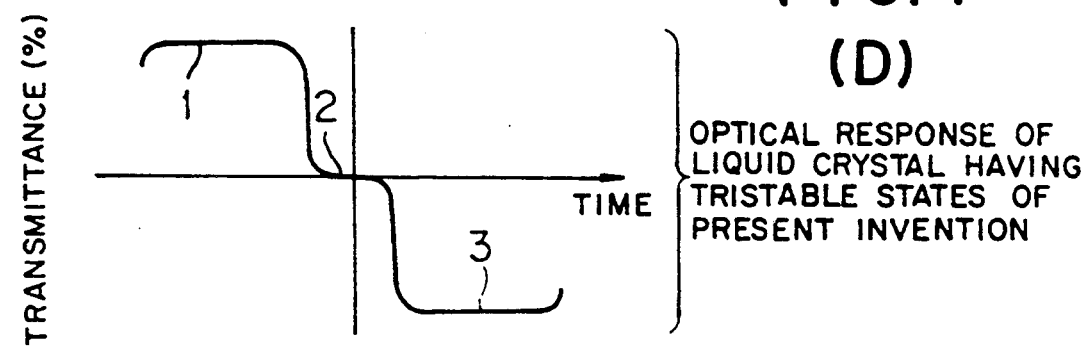
Figure 2:
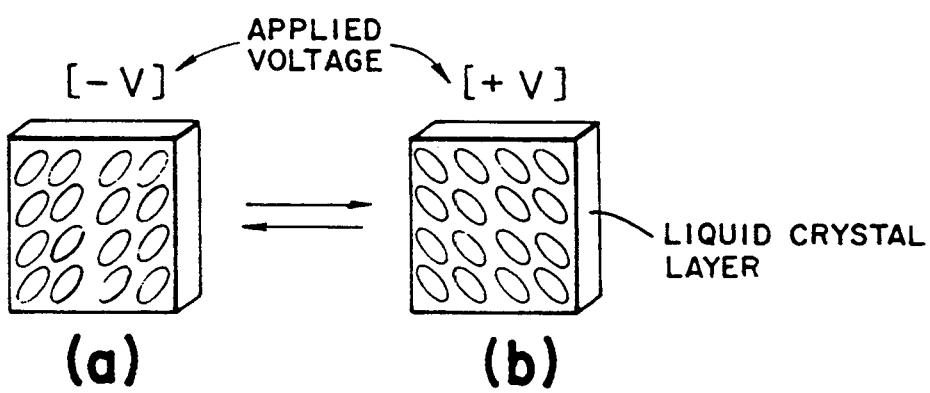
FIG. 2 shows two stabilized aligned states respectively identified by reference points (a) and (b) of ferroelectric liquid crystal molecules as proposed by Clark and Lagawall.
Figure 3:
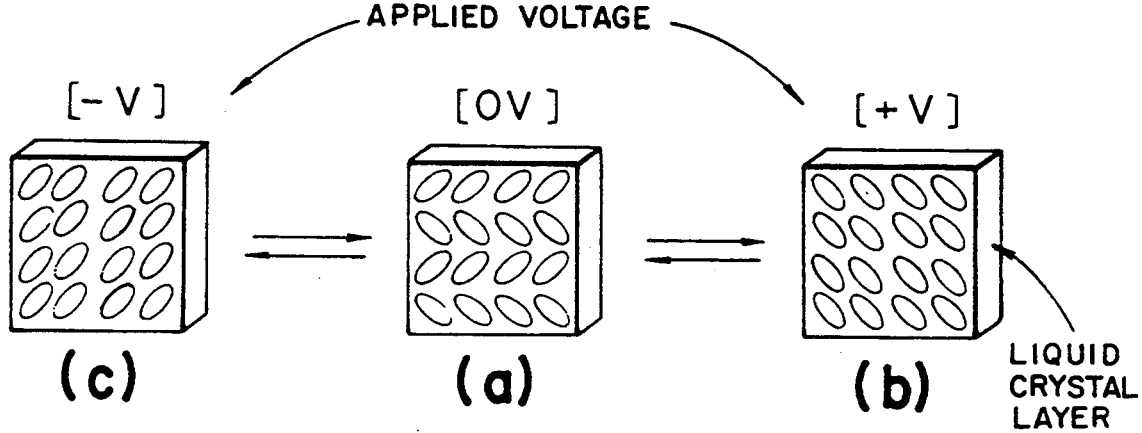
FIG. 3 shows three stabilized aligned states exhibited by antiferroelectric liquid crystal molecules at reference points (a), (b), and (c).
Figure 4:
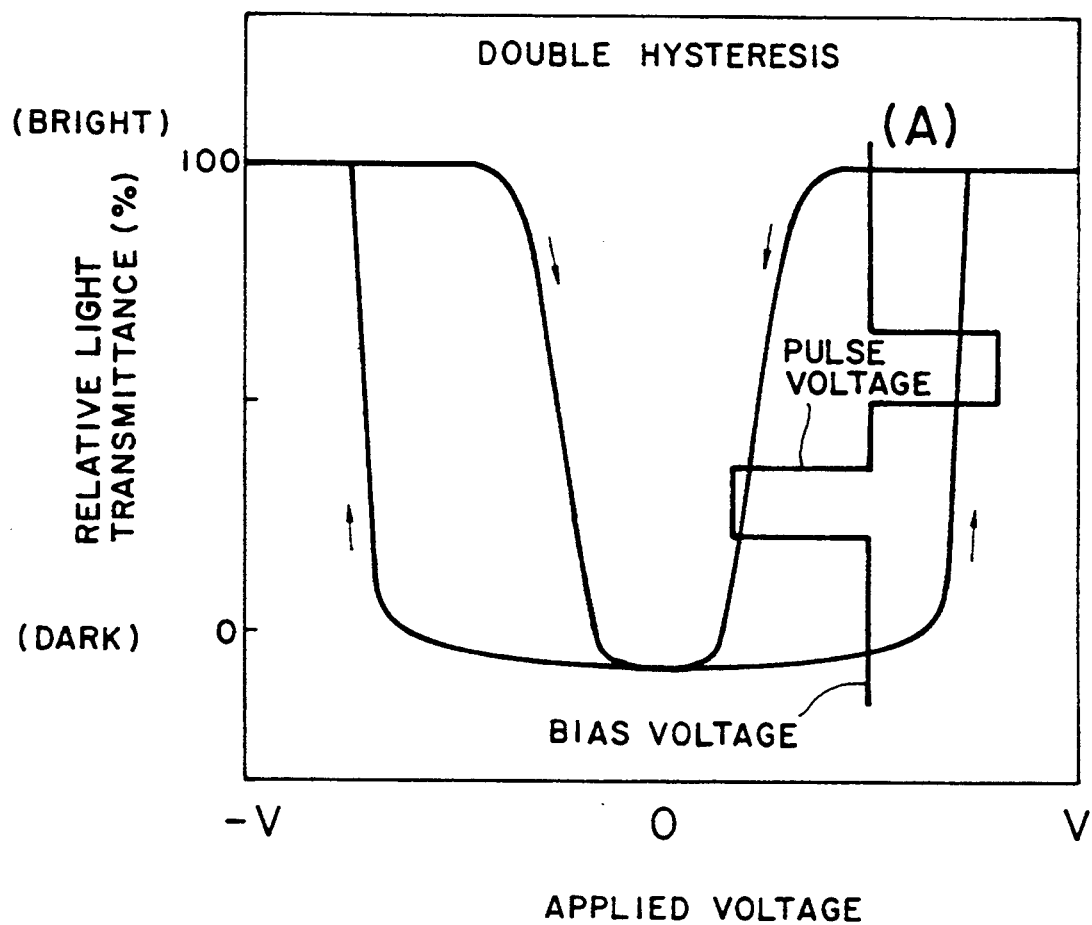
FIG. 4 is a graph showing the characteristic of applied voltage-light transmittance which indicates that antiferroelectric liquid crystal molecules change their light transmittance while drawing a hysteresis curve following the applied voltage.

The first aspect of the present invention relates to a liquid crystal compound represented by the following general formula (I):

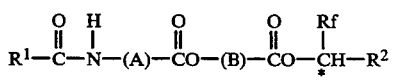

wherein $R^1$ and $R^2$ are independently selected from the group consisting of alkyl groups having from 3 to 18 carbon atoms, Rf is a lower alkyl group or a lower fluoro alkyl group, (A) and (B) are independently selected from the group consisting of phenyl, biphenyl, and naphthalene groups which may be substituted at least with a halogen atom, and * shows an asymmetric carbon atom.

In the formula (I) mentioned above, the (A) is preferably selected independently from the group consisting of

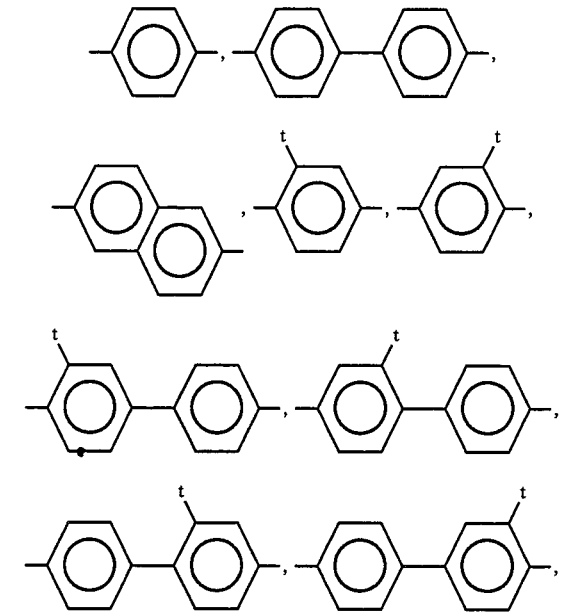

and the (B) is also preferably selected independently from the group consisting of

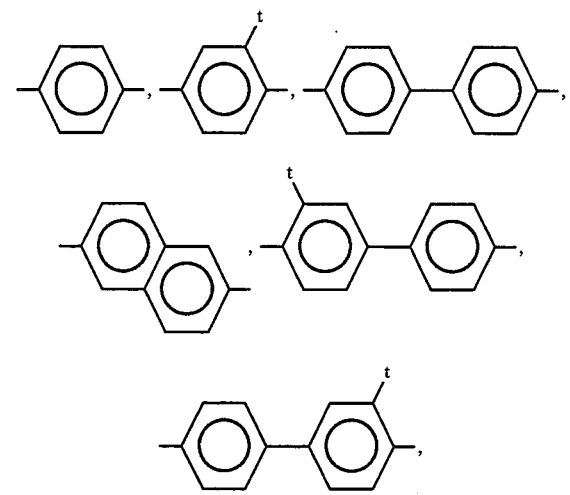

in each of the (A) and (B), t represents a halogen atom, Rf is a group selected from the group consisting of $CF_3$, $C_2F_5$, $CHF_2$, $CH_2F$, and $CH_3$, respectively.

Particularly, the (A) is preferably

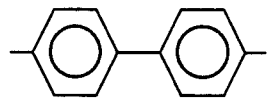

and the (B) is preferably

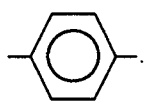

The second aspect of the present invention relates to a liquid crystal composition containing at least one liquid crystal compound mentioned above.

As an example of ordinary methods for synthesizing a compound of the present invention represented by the general formula (I) mentioned above is explained as follows:

lyst, and $CuCr_2O_4$ catalyst. Besides, a zinc-hydrochloric acid and stannous chloride-hydrochloric acid can be used to convert a nitro group to amino group.

(d) Finally, the amine derivative (4) mentioned above is subjected to a reaction with a straight chain or branched chain aliphatic carboxylic acid chloride to obtain the objective compound (5).

According to the present invention, a novel antiferroelectric liquid crystal compound having an amide linkage can be provided for the first time. Further, a liquid crystal composition containing such liquid crystal compound demonstrates usefulness as a composition showing a phase transition temperature at a high temperature.

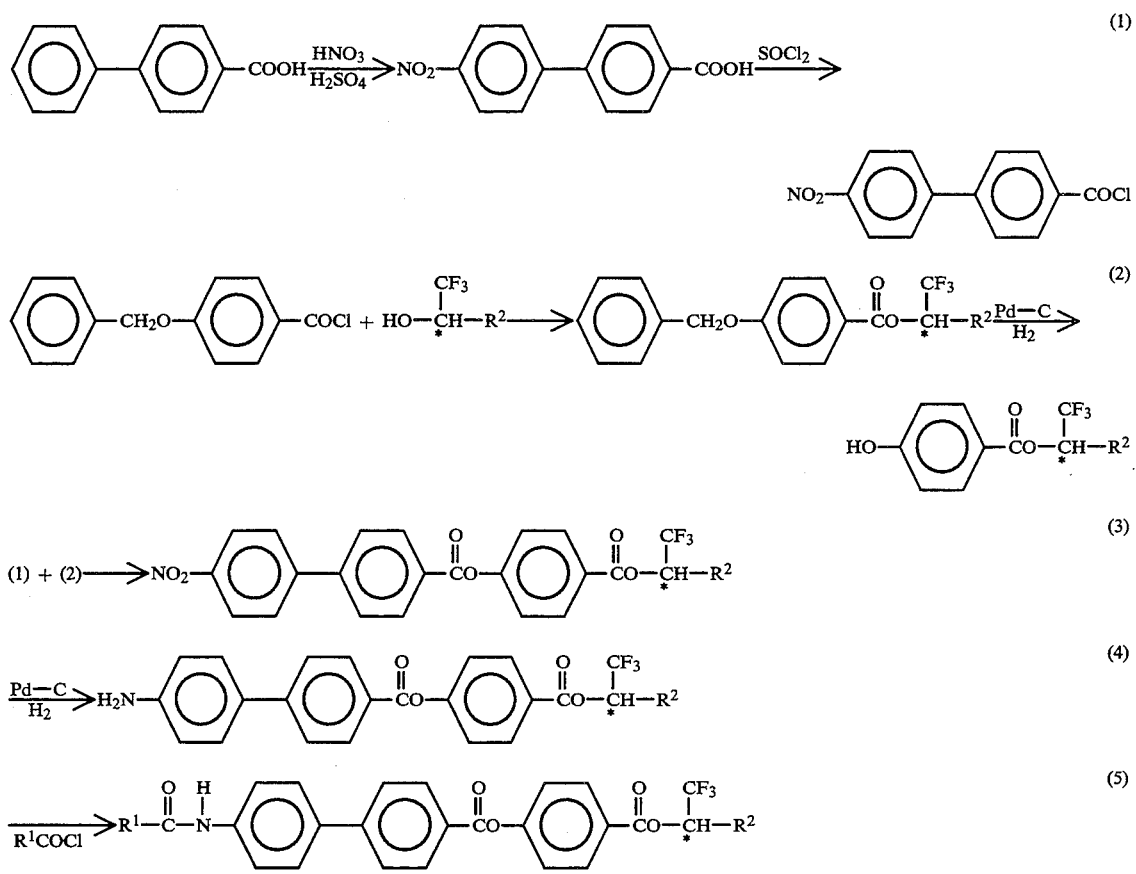

(a) Biphenyl-4-carboxylic acid is subjected to nitration by a conventional method and then converted into acid chloride (1) with an chlorinating agent such as thionyl chloride and oxalyl chloride.

(b) An alcohol used as a raw material such as an optically active 1,1,1-trifluoro-2-alkanol is subjected to an esterification reaction with 4-benzyloxybenzoic acid chloride and then subjected to debenzylation reaction to obtain compound (2).

(c) The acid chloride (1) mentioned above is subjected to an esterification reaction with the compound (2) mentioned above to synthesize compound (3), and the compound (3) is further subjected to a hydrogenation reaction to convert a nitro group to amino group to prepare an amine derivative (4).

The hydrogenation reaction is conducted under the atmosphere of a hydrogen gas and the catalyst used in the reaction preferably includes a palladium (Pd)-carbon catalyst, $PtO_2$—$RhO_2$ catalyst, Raney nickel cata- The present invention will now be described in further detail with reference to Examples. However, it should be understood that the present invention is by no means restricted by such specific Examples.

EXAMPLE 1

Synthesis of 4(1,1,1-trifluoro-2-octyloxycarbonyl) phenyl 4-4'-(n-nonanoylamino)biphenylcarboxylate

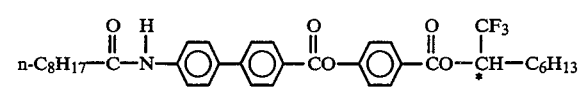

[1] Synthesis of 4-4'-nitrobiphenylcarboxylic acid

A liquid mixture of 28 g of a concentrated nitric acid and 37 g of a concentrated sulfuric acid was slowly added with 19.8 g of 4-biphenylcarboxylic acid while vigorously stirring and cooling with ice. After finishing the addition of the carboxylic acid, the mixture thus formed was stirred first at an ambient temperature for 2 hours and then at 60° C. for 1 hour to react.

After the termination of the reaction, a pale yellow slurry thus formed was poured in a cold water. The precipitates thus formed were subjected to suction filtration, and the precipitates filtered off were washed with water and then recrystallized from tetrahydrofuran (THF)-ethyl acetate (1:1) to obtain 19.7 g of pale yellow 4-4'-nitrobiphenylcarboxylic acid. The yield was 81%.

[2] Synthesis of 4-4'-nitrobiphenylcarboxylic acid chloride

In 10 ml (0.1 mol) of thionyl chloride, 6.16 g (0.025 mol) of 4-4'-nitrobiphenylcarboxylic acid prepared in the reaction step [1] mentioned above was dissolved. The solution was then added with few drops of N,N-dimethyl formamide and subjected to reflux at 80° C. for 10 hours. Then, an excess amount of thionyl chloride was distilled off at a reduced pressure to obtain 6.64 g (0.025 mol) of 4-4'-nitrobiphenylcarboxylic acid chloride which was the objective compound in this reaction step. The yield was 100%.

[3] Synthesis of 1,1,1-trifluoro-2-octyl 4-benzyloxybenzoate

After 3.7 g of (R)-(+)-1,1,1-trifluoro-2-octanol and 1.2 g of triethylamine were added to 40 ml of methylene chloride to form a mixture, 40 ml of methylene chloride solution containing 4.3 g of 4-benzyloxybenzoic acid chloride was dropped with stirring to the mixture. Further, 0.5 g of dimethylaminopyridine was added and the mixture thus formed was stirred at an ambient temperature for a whole day and night. Thereafter, the reaction liquid was poured in a water tank to make it neutral. After the methylene chloride layer thus formed was extracted, the reaction liquid was dehydrated with an anhydrous magnesium sulfate. After the solvent was distilled off, the reaction product thus formed was subjected to separation and purification by a silica gel column chromatography to obtain 3.5 g of the objective compound.

[4] synthesis of 1,1,1-trifluoro-2-octyl 4-hydroxybenzoate

In 15 ml of ethanol, 1.8 g of 1,1,1-trifluoro-2-octyl 4-benzyloxybenzoate prepared in the reaction step [3] mentioned above was dissolved and 0.3 g of Pd-carbon was further added. The mixture was stirred at an ambient temperature for a whole day and night under a hydrogen gas atmosphere. After the Pd-carbon was filtered off, the solvent was distilled off at a reduced pressure to obtain 1.4 g of the objective compound.

[5] Synthesis of 4-(1,1,1-trifluoro-2-octyloxycarbonyl)phenyl 4-4'-nitrobiphenylcarboxylate In 10 ml of methylene chloride, 0.93 g of (R)-(+)-1,1,1-trifluoro-2-octyl 4-hydroxybenzoate and 0.35 g of triethylamine were added to form a mixture, and 9 ml of methylene chloride solution containing 0.92 g of 4-4'-nitrobiphenylcarboxylic acid chloride prepared in the reaction step [2] mentioned above was dropped while stirring. Further, 0.1 g of dimethylaminopyridine was added to the mixture and the mixture was stirred at an ambient temperature for a whole day and night.

Thereafter, the reaction liquid thus formed was poured in a water tank to make it neutral. After the methylene chloride layer thus formed was extracted, the reaction liquid was dehydrated with an anhydrous magnesium sulfate. After the solvent was distilled off at a reduced pressure, the reaction product was subjected to separation and purification by a silica gel column chromatography to obtain 1.04 g of the objective compound.

[6] Synthesis of 4-(1,1,1-trifluoro-2-octyloxycarbonyl)phenyl 4-4'-aminobiphenylcarboxylate In 50 ml of ethanol, 1.04 g of 4-(1,1,1-trifluoro-2-octyloxycarbonyl)phenyl 4-4'-nitrobiphenylcarboxylate prepared in the reaction step [5] mentioned above was dissolved and 0.21 g of Pd-carbon was further added. The mixture thus formed was stirred at an ambient temperature for a whole day and night under a hydrogen gas atmosphere. After the Pd-carbon was filtered off, the solvent was distilled off to obtain 0.72 g of the objective compound.

[7] Synthesis of 4-(1,1,1-trifluoro-2-octyloxycarbonyl)phenyl 4-4'-(n-nonanoylamino)biphenylcarboxylate In 5 ml of methylene chloride, 0.15 g of 4-(1,1,1-trifluoro-2-octyloxycarbonyl)phenyl 4-4'-aminobiphenylcarboxylate and 0.04 g of triethyl amine were added to form a mixture, and then 1 ml of methylene chloride solution containing 0.08 g of n-nonanoic acid chloride was dropped while stirring. Further, 0.01 g of dimethylaminopyridine was added to the mixture and the mixture was stirred at an ambient temperature for a whole day and night. Thereafter, the reaction liquid thus formed was poured in a water tank to make it neutral. After the methylene chloride layer thus formed was extracted, the reaction liquid was dehydrated with an anhydrous magnesium sulfate. After the solvent was distilled off at a reduced pressure, the reaction product thus formed was subjected to separation and purification by a silica gel column chromatography and also subjected to recrystallization from ethanol to obtain 0.10 g of the final objective compound.

The phase transition temperatures (°C.) of the final compound observed with a polarizing microscope equipped with a hotstage were as follows:

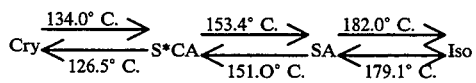

EXAMPLE 2

Synthesis of 4-(1,1,1-trifluoro-2-octyloxycarbonyl) phenyl 4-4'-(n-decanoylamino)biphenylcarboxylate

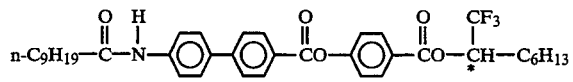

Example 1 was repeated except that n-decanoic acid chloride was used instead of n-nonanoic acid chloride in the reaction step [7] to obtain 0.13 g of the objective compound.

The phase transition temperatures (°C.) of the objective compound observed with a polarizing microscope equipped with a hotstage were as follows:

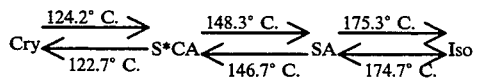

EXAMPLE 3

Synthesis of 4-(1,1,1-trifluoro-2-octyloxycarbonyl)phenyl 4-4'-(n-undecanoylamino)biphenylcarboxylate

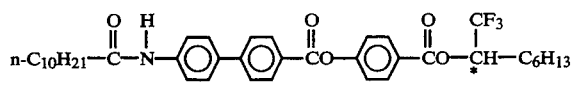

Example 1 was repeated except that n-undecanoic acid chloride was used instead of n-nonanoic acid chloride in the reaction step [7] to obtain 0.13 g of the objective compound.

The phase transition temperatures (°C.) of the objective compound observed with a polarizing microscope equipped with a hotstage were as follows:

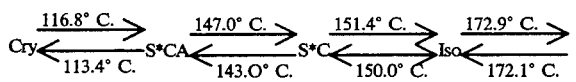

EXAMPLE 4

Synthesis of 4-(1,1,1-trifluoro-2-octyloxycarbonyl)phenyl 4-4'-(n-dodecanoylamino)biphenycarboxylate

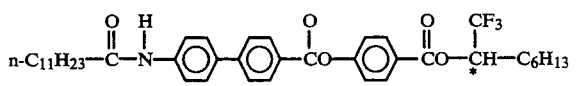

Example 1 was repeated except that n-dodecanoic acid chloride was used instead of n-nonanoic acid chloride to obtain 0.17 g of the objective compound.

The phase transition temperatures (°C.) of the objective compound observed with a polarizing microscope equipped with a hotstage were as follows:

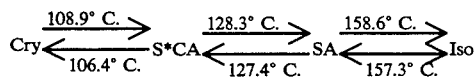

EXAMPLE 5

The liquid crystal compound, 4-(1,1,1-trifluoro-2-octyloxycarbonyl)phenyl 4-4'-(n-undecanoylamino)biphenylcarboxylate obtained in Example 3 was filled in the form of an isotropic phase to a liquid crystal cell having a cell thickness of 1.6 μm and also having rubbed polyimide oriented films on ITO electrode substrates to prepare a liquid crystal thin film cell.

The liquid crystal cell thus prepared was arranged on a polarizing microscope equipped with a photomultiplier where 2 polarizing plates were orthogonally arranged with each other in such a state that the visual field is dark when voltage is 0 V.

Figure 5:
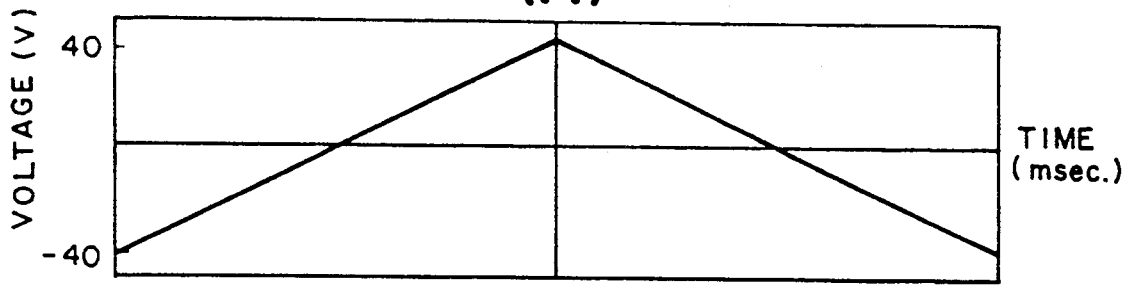
FIG. 5(A) shows an applied triangular wave voltage.
FIG. 5(B) shows the change in the light transmittance of an electric crystal compound prepared by present Example 3 against the triangular wave voltage applied at 138.0° C., see in Example 5.
Figure 5:
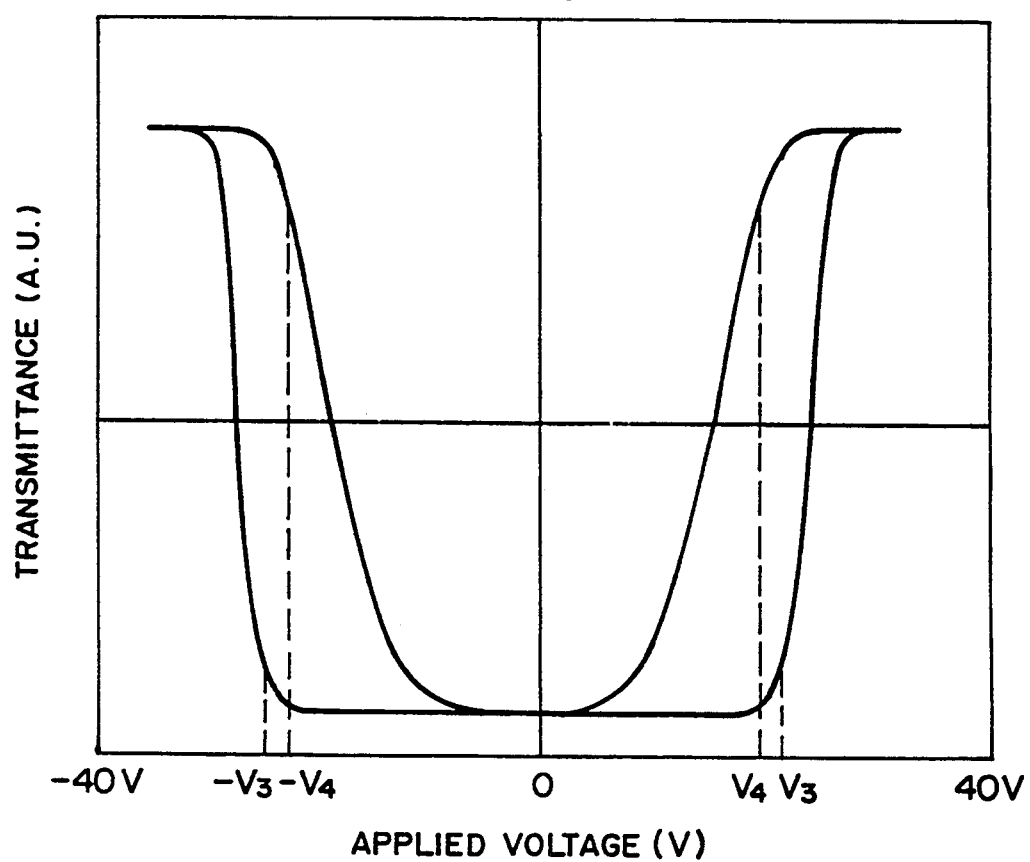

The liquid cell was slowly cooled down to a phase SA at a temperature gradient of 0.1 to 1.0° C./min. The cell was further cooled down and applied with a triangular wave voltage of ±40 volt and 1 $H_z$ as shown in FIG. 5(A) at a temperature within the range from 113.4° C. to 143.0° C. From the relationship between the applied voltage at a temperature of 138° C. and transmittance, the hysteresis as shown in FIG. 5(B) was obtained.

The visual field kept a dark state in the range from 0 V to nearly $V_3$. It became a bright state after a steep rising at $+V_3$. The field kept a bright state in the range from $+40$ V to nearly $V_4$ and suddenly became a dark state at $+V_4$. The field kept a dark state in the range from 0 V to nearly $-V_3$ and became a bright state after a steep rising at $-V_3$. A bright state was kept in the range from $-40$ V to nearly $-V_4$ and became a dark state at $-V_4$.

When the applied voltage was changed from $+40$ V to $-40$ V, it was observed that the visual field was changed in such an order of three states as bright to dark to bright accompanied with the switching, and existence of three stable aligned states of liquid crystal molecules was confirmed.

The same effects were confirmed with the compounds of even other Examples in the same kind of phase $S^*_{(3)}$.

We claim:

1. An antiferroelectric liquid crystal compound represented by the following general formula (I):

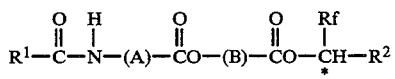

wherein $R^1$ and $R^2$ are each independently selected from the group consisting of alkyl groups having from 3 to 18 carbon atoms, Rf is a lower alkyl group or a fluorinated lower alkyl group, (A) and (B) are each independently selected from the group consisting of 1,4-phenylene, 4,4-biphenylene, and 2,6-naphthalene which may be substituted with at least a halogen atom, and * shows an asymmetric carbon atom.

2. The antiferroelectric liquid crystal compound according to claim 1, wherein the (A) group is independently selected from the group consisting of

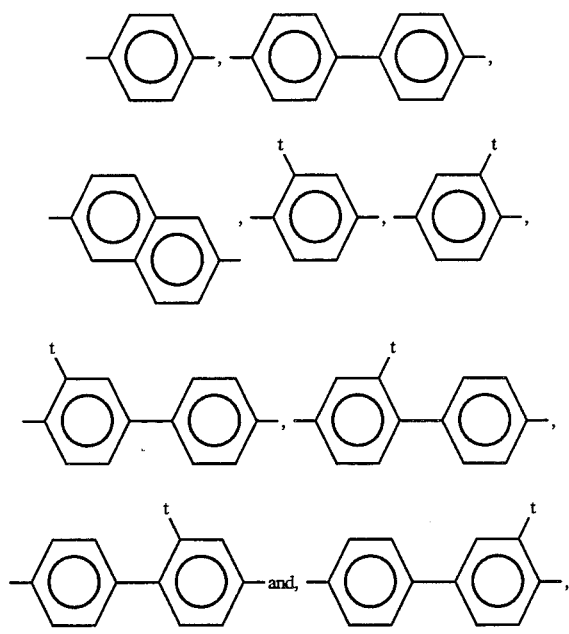

and the (B) group is independently selected from the group consisting of

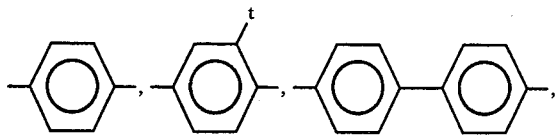

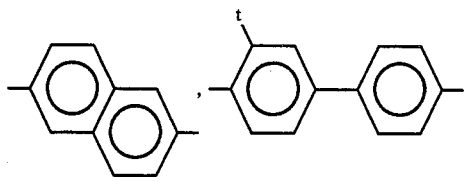

and

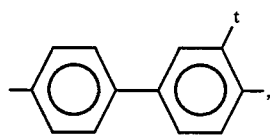

wherein t represents a halogen atom and Rf is selected from the group consisting of —CF$_3$, —C$_2$F$_5$, —CHF$_2$, —CH$_2$F, and —CH$_3$.

3. The antiferroelectric liquid crystal compound according to claim 1, wherein the (A) group is 4,4'-biphenylene and the (B) group is 1,4-phenylene.

4. The antiferroelectric liquid crystal compound according to claim 3, wherein Rf is selected from the group consisting of —CH$_3$, —CF$_3$, —C$_2$F$_5$, and —CH$_2$F.

5. The antiferroelectric liquid crystal compound according to claim 1, wherein Rf is selected from the group consisting of —CH$_3$, —CF$_3$, —C$_2$F$_5$, and —CH$_2$F.

6. The antiferroelectric liquid crystal compound according to claim 5, wherein Rf is —CH$_3$.

7. A liquid crystal composition containing at least one liquid crystal compound represented by the following general formula (I):

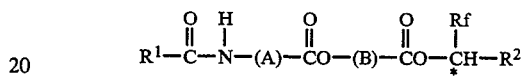

wherein R$^1$ and R$^2$ are each independently selected from the group consisting of C$_3$-C$_{18}$ alkyl groups, Rf is a lower alkyl group or a fluorinated lower alkyl group, (A) and (B) are each independently selected from the group consisting of 1,4-phenylene, 4,4'-biphenylene, and 2,6-naphthalene which may be substituted with at least a halogen atom, and * shows an asymmetric carbon atom.

* * * * *